(12) United States Patent
Shaw

(10) Patent No.: US 10,972,702 B2
(45) Date of Patent: Apr. 6, 2021

(54) INTELLIGENT ADAPTIVE AND CORRECTIVE LAYOUT COMPOSITION

(71) Applicant: Pexip AS, Oslo (NO)

(72) Inventor: Eamonn Shaw, Fredrikstad (NO)

(73) Assignee: Pexip AS, Oslo (NO)

(*) Notice: Subject to any disclaimer, the term of this patent is extended or adjusted under 35 U.S.C. 154(b) by 0 days.

(21) Appl. No.: 16/898,879

(22) Filed: Jun. 11, 2020

(65) Prior Publication Data

US 2021/0029327 A1    Jan. 28, 2021

(30) Foreign Application Priority Data

Jun. 28, 2019 (NO) .................................... 20190816

(51) Int. Cl.
*H04N 7/15* (2006.01)
*H04N 5/232* (2006.01)

(52) U.S. Cl.
CPC ......... *H04N 7/152* (2013.01); *H04N 5/23212* (2013.01); *H04N 5/23219* (2013.01); *H04N 5/23299* (2018.08)

(58) Field of Classification Search
CPC ........... H04N 7/15; H04N 5/232; H04N 7/152
USPC ............................................ 348/14.01–14.16
See application file for complete search history.

(56) References Cited

U.S. PATENT DOCUMENTS

| | | | |
|---|---|---|---|
| 9,774,823 B1 | 9/2017 | Gadnir et al. | |
| 9,942,518 B1 | 4/2018 | Tangeland et al. | |
| 2008/0291265 A1* | 11/2008 | Wagner | H04N 7/152 |
| | | | 348/14.16 |

(Continued)

FOREIGN PATENT DOCUMENTS

| | | |
|---|---|---|
| EP | 2373015 A2 | 10/2011 |
| EP | 3266190 | 1/2018 |
| EP | 3287947 A1 | 2/2018 |
| WO | 2010059481 A1 | 5/2010 |
| WO | 2013062509 A1 | 5/2013 |
| WO | WO-2013062509 A1 * 5/2013 | ............... H04N 7/15 |
| WO | 2015157201 A1 | 10/2015 |
| WO | 2016168158 A1 | 10/2016 |

OTHER PUBLICATIONS

Norwegian Search Report dated Jan. 24, 2020 for corresponding Norwegian paten Application No. 20190816 filed on Jun. 28, 2019; consisting of 2-pages.

(Continued)

*Primary Examiner* — Melur Ramakrishnaiah
(74) *Attorney, Agent, or Firm* — Christopher & Weisberg, P.A.

(57) ABSTRACT

The present invention creates compositions of pictures in multipoint conferences that emulate natural interaction and existing aesthetic sensibilities learned from visual media by a combination of correcting and adapting the composition of the picture content and the layout, preferably in the MCN of the conference, where real-time conference data is available, in addition to statistics and knowledge of historical conference data. Further, cross checking incoming imagery against a ruleset where compositional deltas are identified is done, and these corrective transformations are applied, and the resulting corrections and remixes are applied to the layout. More advanced transformations to the final composition based on presence and context define a layout. The ruleset could be both static and dynamic, or a combination, and the final recomposition of the layout may be a result of both corrective and adaptive transformations.

20 Claims, 5 Drawing Sheets

(56) References Cited

U.S. PATENT DOCUMENTS

| | | | |
|---|---|---|---|
| 2009/0256901 A1* | 10/2009 | Mauchly | H04N 21/64322 |
| | | | 348/14.07 |
| 2009/0309897 A1 | 12/2009 | Morita et al. | |
| 2010/0103245 A1 | 4/2010 | Decker et al. | |
| 2010/0123770 A1 | 5/2010 | Friel et al. | |
| 2011/0115876 A1 | 5/2011 | Khot et al. | |
| 2015/0097915 A1 | 4/2015 | Navon et al. | |
| 2016/0295169 A1* | 10/2016 | Hiller | H04N 7/147 |
| 2018/0098029 A1 | 4/2018 | Cassini et al. | |

OTHER PUBLICATIONS

International Type Search Report dated Feb. 27, 2020, for corresponding Norwegian paten Application No. 20190816 filed on Jun. 28, 2019; consisting of 5-pages.

* cited by examiner

INTELLIGENT ADAPTIVE AND CORRECTIVE LAYOUT COMPOSITION

CROSS-REFERENCE TO RELATED APPLICATION

This application claims priority to Norwegian Patent Application Serial No. 20190816, filed Jul. 19, 2019, entitled INTELLIGENT ADAPTIVE AND CORRECTIVE LAYOUT COMPOSITION the entirety of which is incorporated herein by reference.

STATEMENT REGARDING FEDERALLY SPONSORED RESEARCH OR DEVELOPMENT n/a

FIELD

The present invention relates to providing a dynamic and balanced visual layout composition of a multisite video conference.

BACKGROUND

Transmission of moving pictures in real-time is employed in several applications like e.g. video conferencing, team collaboration software, net meetings and video telephony. Terminals and endpoints being able to participate in a conference may be traditional stationary video conferencing endpoints, external devices, such as mobile and computer devices, smartphones, tablets, personal devices and PCs.

Video conferencing systems allow for simultaneous exchange of audio, video and data information among multiple conferencing sites. For performing multipoint video conferencing, there usually has to be some kind of a Multipoint Conferencing Node (MCN) provides switching and layout functions to allow the endpoints and terminals of multiple sites to intercommunicate in a conference. Such nodes may also be referred to as Multipoint Control Units (MCUs), Multi Control Infrastructure (MCI), Conference Nodes and Collaborations Nodes (CNs). A person skilled in the art would know that MCU is the most common used term, but that it traditionally has been associated with hardware dedicated to the purpose. The functions of an MCN could just as well be implemented in software installed on general purpose severs and computers, so in the following, all kinds of nodes, devices and software implementing features, services and functions providing switching and layout functions to allow the endpoints and terminals of multiple sites to intercommunicate in a conference, including (but not excluding) MCUs, MCIs and CNs are from now on referred to as MCNs.

An MCN links the sites together by receiving frames of conference signals from the sites, processing the received signals, and retransmitting the processed signals to appropriate sites. The conference signals include audio, video, data and control information. As an example, in a switched conference, the video signal from one of the conference sites, typically that of the loudest speaker, is broadcast to each of the participants. In a so-called continuous presence conference, video signals from two or more sites are spatially mixed to form a composite video signal for viewing by conference participants. When the different video streams have been mixed together into one single video stream, the composed video stream is transmitted to the different parties of the video conference, where each transmitted video stream preferably follows a set scheme indicating who will receive what video stream. In general, the different users prefer to receive different video streams. The continuous presence or composite video stream is a combined picture that may include live video streams, still images, menus, indicators or other visual images from participants in the conference.

There have been several attempts to create dynamic layouts of a mixed video picture in video conferencing to be natural and intuitive and heightening the engagement of the participants more in line with what would be the case in to emulate meetings of physical presence.

A typical example of a composed video stream according to prior art is illustrated in FIG. 1. In this case, there rules of dynamically composing the MCN layout may simply have been:

Adjust the picture of the last two speakers to a side-by-side picture covering the upper part of the display.

Put an overlaid picture of the shared screen in the left uppermost corner.

Distribute the pictures of the rest of the participants evenly on the lower part of the screen.

In the example above, the participant speaking and the participant previously speaking are dynamically brought to attention, and the presentation is placed in a corner. This is an example of audio as the sole input in recalculating display order within a meeting layout. This approach has proven to be far from being as engaging as meetings of physical presence. The layout of FIG. 1 appears disorganized and disengaging. The common context of presence and participation in the meeting is undermined.

WO 2010/059481 A1 discloses multiple video camera processing for teleconferencing and a method for creating a composed picture layout using face detection and Pan Zoom Tilt (PZT).

Thus, there is a need for visual meetings of composed pictures being more engaging, intuitive and user-friendly to achieve an even more physical presence like multipoint videoconference experience.

SUMMARY

In view of the above, an object of the present disclosure is to overcome the above mention problems. In particular, the present disclosure includes a method for creating a composed picture layout based on a first set of pictures available in a Multipoint Control Node (MCN) and one or more ruleset(s), the method further includes the steps of performing a PZT (Pan Zoom Tilt) process on each of the first set pictures according to a corresponding output of a face detection process in view of a corrective ruleset from the one or more ruleset(s) resulting in a second set of pictures, counting the respective number of detected faces from the face detection process for each of the pictures in the second set of pictures, creating the composed picture layout by arranging the second set of pictures according to the respective number of detected faces in view of a weighted presence ruleset from the one or more ruleset(s) and/or a composition plane defining an overall pattern of the composed picture layout and/or a context.

The present disclosure also includes a corresponding Picture Layout Composer.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein:

FIG. 2b shows an example of a composed layout corrected from the conference situation illustrated FIG. 2a;

DETAILED DESCRIPTION

According to embodiments herein, the above mentioned disadvantages of the present invention are eliminated.

The main goal of the present invention is to create compositions of pictures in multipoint conferences that emulate natural interaction and existing aesthetic sensibilities learned from visual media. This is done by a combination of correcting and adapting the composition of the picture content and the layout. In several embodiments of the present invention, this is carried out in the MCN of the conference, where real-time conference data is available, in addition to statistics and knowledge of historical conference data.

The overall process of embodiments according to the present invention is to cross check incoming imagery against a ruleset where compositional deltas are identified. These corrective transformations are applied, and the resulting corrections and remixes are applied to the layout. More advanced transformations to the final composition based on presence and context define a layout. The ruleset could be both static and dynamic, or a combination, and the final recomposition of the layout may be a result of both corrective and adaptive transformations.

As already indicated, a first aspect of the present invention is correction of picture content to improve the overall impression of the multipoint layout.

Figure 1:
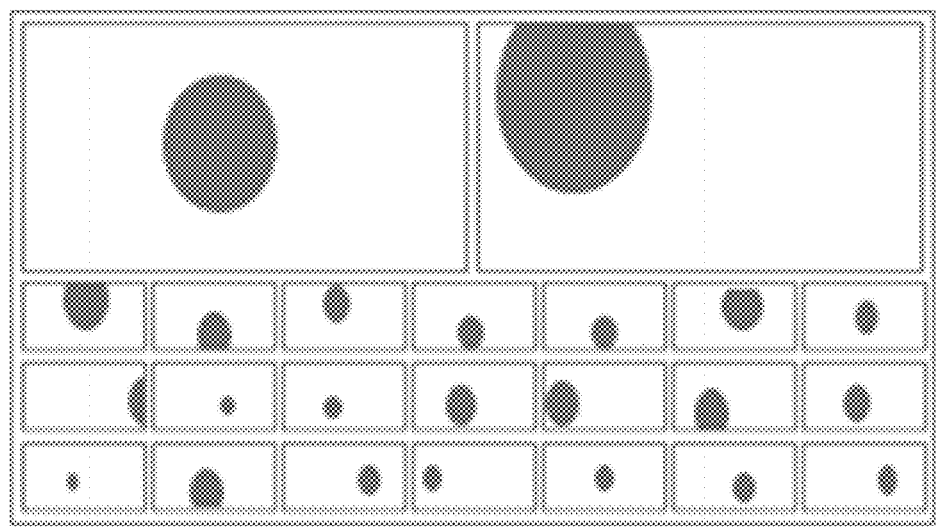
FIG. 1 shows an example of a composed video stream according to prior art.
Figure 2A:
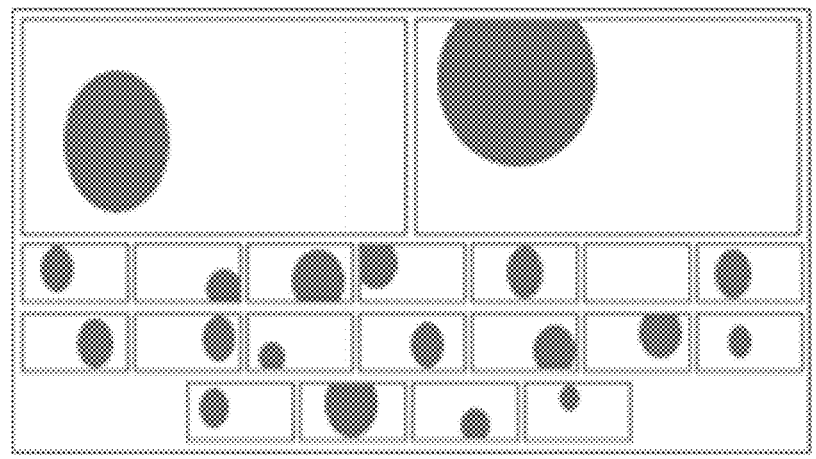
FIG. 2a is an illustration of a disorganized and disengaging impression of the multipoint video conference.

A disorganized and disengaging impression of the multipoint video conference illustrated of FIG. 2a, is according to one embodiment of the present invention to some extend corrected by face detection and a corresponding PTZ operation. The rule according to this would for example be to pan, tilt and/or zoom each received picture to position the detected face or faces in a portrait-like position within the picture, which means a close shot focuses on the subject's face. An additional rule may be to state that if Far End Camera Control (FECC) is available, then FECC instructions corresponding to the determined face position correction are transmitted to the terminal or endpoint capturing the picture. If FECC not is available, then a digital PTZ operation corresponding to the determined face position correction is carried out. FECC is a protocol from the ITU-T Recommendation H.323 Annex Q.

Figure 2B:
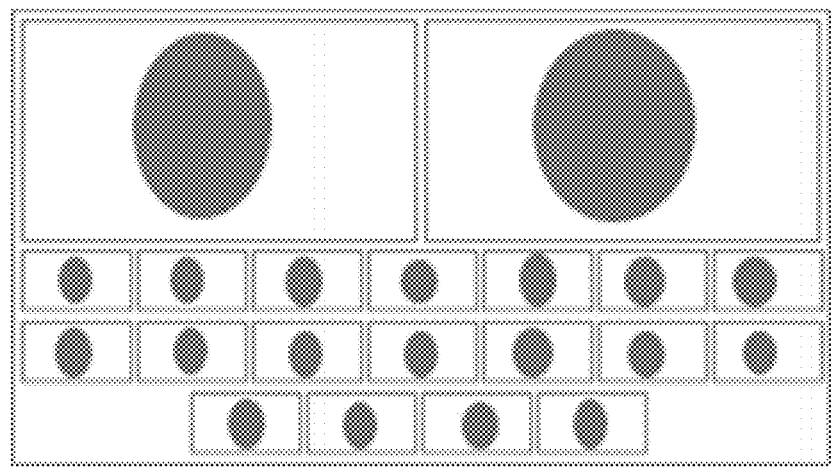

FIG. 2b shows an example of a composed layout of face detection and a corresponding PTZ close shot focus operation of the mixed picture exposed to the conference situation illustrated FIG. 2a.

Face detection is a computer technology being used in a variety of applications that identifies human faces in digital images.

Face-detection algorithms focus on the detection of frontal human faces. It is analogous to image detection in which the image of a person is matched bit by bit. Image matches with the image stores in database.

An example of reliable face-detection approach is based on the genetic algorithm and the eigen-face technique.

Firstly, the possible human eye regions are detected by testing all the valley regions in the gray-level image. Then the genetic algorithm is used to generate all the possible face regions which include the eyebrows, the iris, the nostril and the mouth corners.

Each possible face candidate is normalized to reduce both the lighting effect, which is caused by uneven illumination; and the shirring effect, which is due to head movement. The fitness value of each candidate is measured based on its projection on the eigen-faces. After a number of iterations, all the face candidates with a high fitness value are selected for further verification. At this stage, the face symmetry is measured and the existence of the different facial features is verified for each face candidate.

The corrective aspect of the present invention utilizes face detection and may include several types of rules depending on context and preferences. In the following three different examples of this are disclosed.

Full-A full shot shows the entire subject's body from head to toe. It's used to give a subject context in their setting. It shows how they relate physically to their surroundings i.e. at a whiteboard or standing at a podium in a townhall meeting. A Full shot is sometimes used as an establishing shot, setting the scene and defining context.

Medium-A medium shot shows the subject from the waist up. It's useful when a subject is conveying information and it still allows you to still see them interacting with(in) their environment. With a medium shot the setting has already been established in prior shots and more emphasis is being placed on the subject.

Close-A close shot focuses on the subject's face. Framing the head, neck, and shoulders, limiting the amount headroom. Close compositions place emphasis on the subject's facial expressions. Zooming in even more, creates an extreme close up. For example, a shot of a subjects' eyes or mouth will show and emphasize an expression during an important moment.

According to some embodiments of the present invention, the composed layout is at least to some extend determined by a Composition Plane defining an overall pattern of the composed picture layout. The composition plane would e.g. be anchor points on which subjects (i.e. pictures, shared desktops etc.), could be placed in a composed layout. As a first example, the composition plane may have 4 lines running through it, two horizontally, and two vertically. Together these lines divide the frame into 9 squares. The intersections on the composition plane are then points to place the subjects. In a second example, the composition plane would be more dynamic, like distributing subjects row-wise, defining a maximum subjects for each respective row of subjects, and defining the number of rows according to the number of sites/locations participating in the conference. In larger video conferences, perfectly centered subjects and/or evenly distributed subjects in each row, would help balancing the compositions. This may also be an additional feature included in the composition plane.

However, to emulate natural interactions in smaller meetings, participants on the left side of a mix should be positioned left of center and those on the right should be positioned off center right. This use of talk-room will strengthen the natural engagement and focus of layouts defined by voice switching.

In some embodiments of the present invention, the mix of pictures in the layout may be exposed to adaptive changes according rules for weighed presence of faces/views and/or according to predefined composition planes. Again, all for optimizing the overall impression of the composed layout.

"Weighted presence" may refer to transformations of layout having one or more components that inform its effect. One of the components may be counting participants. "Weighted presence" would make more sense when being based on some kind of composition plane as discussed above.

Counting participants in each location gives a weight that is used to balance presence display rank in the layout. By counting face detected participants in a location rather than just counting locations, a more accurate input to recomposition can be achieved, and a more engaging depiction of context. A ruleset will then determine the layout transition based on the counted number of human participants in each picture. A simple ruleset could e.g. be:

Locate the X pictures with the most counted human participants on the uppermost horizontal row of pictures of the composed layout.

Arrange the X pictures on the uppermost horizontal row of pictures of the composed layout from left to right according to least to most counted human participants.

This is also based on the second example of the composition plane as discussed above.

This ruleset may in some embodiments according to the present invention be generalized by denoting $P_{ij}$, as the picture position in a composed layout, where i is the horizontal position, and j is the vertical position. i=[1, $X_j$] and j=[1, Y] where i=1 defines the leftmost picture in row j, and j=1 defines the uppermost row. $X_j$ is the maximum number of pictures on row j, and Y is the maximum number of rows. i is then increasing along with increasing counted human participants, and j is decreasing along with increasing counted human participants. $X_j$ and Y may further be determined according to the total number of sites participating in the conference. Note that this could of cause go in the opposite directions as well, perhaps mostly applicable for the horizontal position, i.e. i is then decreasing along with increasing counted human participants.

Figure 3A:
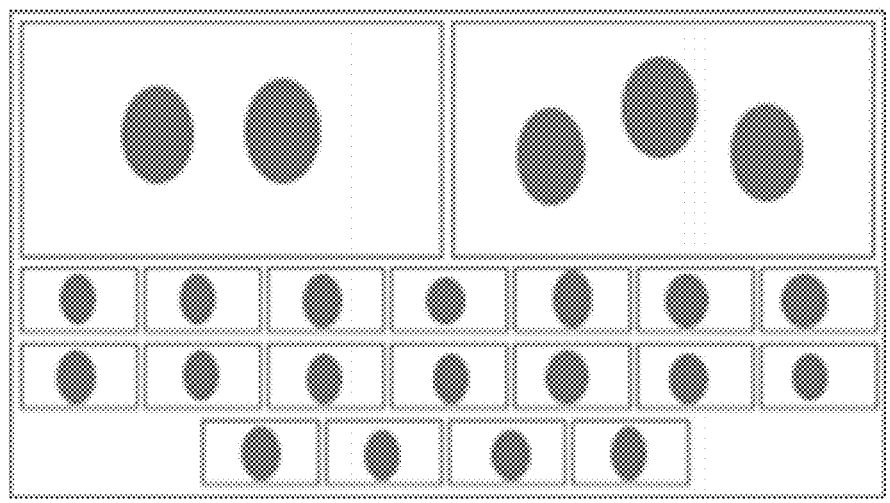
FIG. 3a is an illustration of an unweighted presence picture of a multipoint video conference.
Figure 3B:
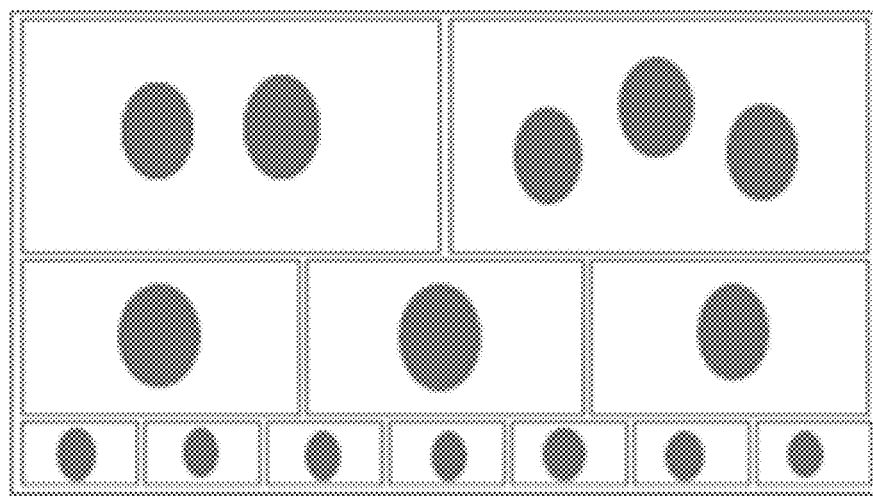
FIG. 3b shows an example of the result of adaptive recomposition based on participant counting.

FIG. 3a is an illustration of an unweighted presence picture of a multipoint video conference, and FIG. 3b is an example of the result of adaptive recomposition based on participant counting as discussed above. Here, there are totally 20 sites participating in the conference, and Y is determined to be 4, $X_1$=2, $X_2$ and $X_3$=7, $X_3$=4. As can be seen, an additional rule in this example is to distribute the picture evenly along the rows.

As already indicated, according to some embodiments of the present invention, conference context may also be included in creating composed layout. The context may be derived from available data like the overall number of participants, media type and default layout to either start with a full shot (zoomed out), or use the framed image provided and edit accordingly based on the number of participants present and the composition principles "Full", "Medium" or "Close" as discussed above. Based on the results of these edits layout changes may be triggered.

Figure 4:
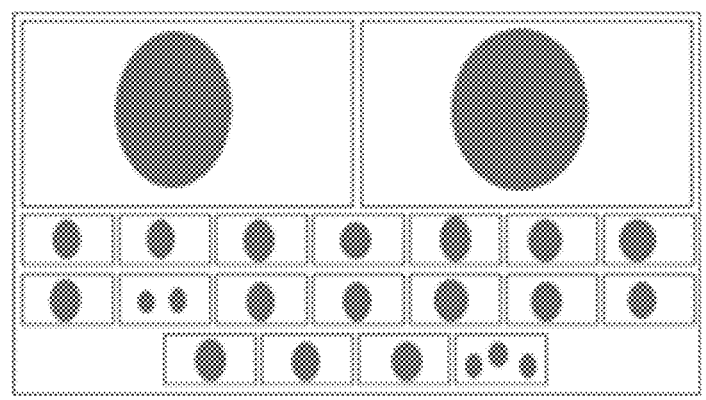
FIG. 4 is an example of a composed layout visually scaled down from FIG. 3b.

FIG. 4 is an example of how the conference of FIG. 3b has visually scaled down. As indicated, three pictures have been exposed to a "Medium" PTZ and placed in the second row of the composed layout, while there is only one row left below with the "Close" PTZ that used to be the majority in the example of FIG. 3a. In this case, the context is changed, e.g. due to a long-lasting high activity of these participants in the meeting. However, since they are placed in the second row, this context is not set to trump the counting rule completely.

Figure 5A:
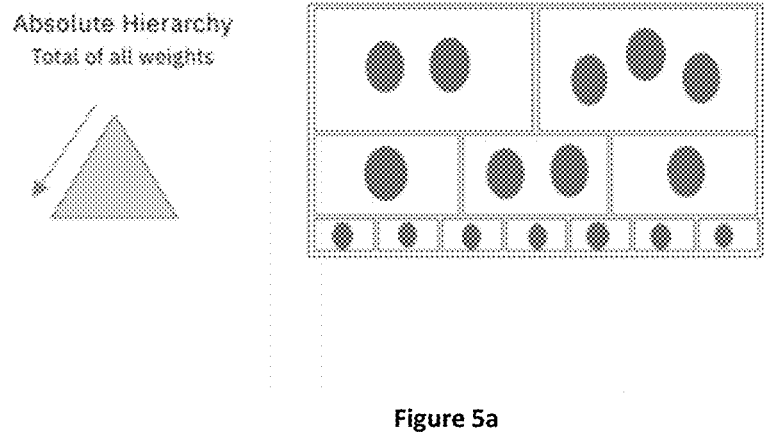
FIG. 5a illustrates an example of a composed layout based on absolute hierarchy.
Figure 5B:
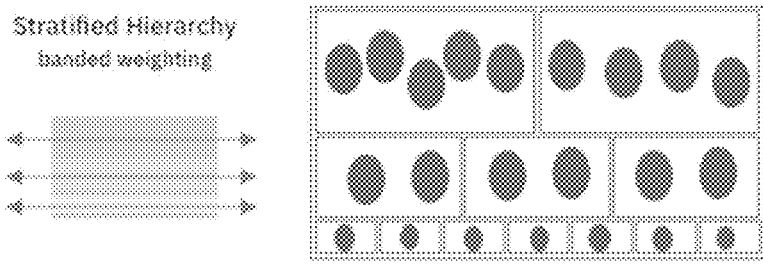
FIG. 5b illustrates an example of a composed layout based on stratified hierarchy.

There are a wide range of rulesets that may be applied. A couple of examples in addition to the ones already mention herein, are illustrated in FIGS. 5a and 5b. In FIG. 5 a composed layout based on absolute hierarchy, which as indicated means that the pictures are arranged in a top to bottom hierarchy according to the total of all weights (counted numbers of faces).

FIG. 5b illustrates an example of a composed layout based on stratified hierarchy which as indicated means that the pictures are arranged in hierarchy according to the banded weighting to make a more uniform weight of faces in each row.

In yet some embodiments of the present invention, once a face is detected the frame can be recomposed to reduce the effects of for example backlighting, as low or high contrast lighting situations participants may be difficult to distinguish from backgrounds. In the absence of a face, the exposure levels can be adjusted to reveal more detail.

In yet another embodiment, participants with headphones interfering in environments that have audio challenges and could be muted. Generally video muted participants disrupt the mix with black video or a disabled icon, which could be represented/switched more intelligently. In one alternative embodiment of the present invention, this could be resolved by demotion of audio participants and the exclusion of commentators from the mix (textmessages). Currently there is no presence for these spectators/passive observers. One of the slots in the layout could facilitate this function, e.g. with a ticker. This is particularly relevant for town halls and streamed events.

The ruleset(s) controlling the composed layout, and the transitions between which, can be static, as indicated in some examples above. However, the ruleset(s) can also be dynamic, e.g. based on video conference statistics, participant behavior and machine learning. This will make the selection of composed layouts and transitions between which, evolve in a more intuitive and natural setups. Key to such an evolvement is access to sufficient data and statistics of behaviors, which is the case in MCNs and cloud-based video conferencing and collaboration.

The embodiments herein may be implemented in a plurality of physical entities, such as an arrangement comprising said one or more physical entities, i.e. the embodiments may be implemented in a distributed manner, such as on a cloud system, which may comprise a set of server machines.

As used herein, the terms "first", "second", "third" etc. may have been used merely to distinguish features, apparatuses, elements, units, or the like from one another unless otherwise evident from the context.

As used herein, the expressions "in some embodiments" and "in certain embodiments" have been used to indicate that the features of the embodiment described may be combined with any other embodiment disclosed herein.

Even though embodiments of the various aspects have been described, many different alterations, modifications and the like thereof will become apparent for those skilled in the art. The described embodiments are therefore not intended to limit the scope of the present disclosure.

What is claimed is:

1. A method for creating a composed picture layout based on a first set of pictures available in a Multipoint Control Node, MCN, and one or more ruleset(s), comprising the steps of:
   performing a Pan Zoom Tilt, PZT, process on each of the first set pictures according to a corresponding output of a face detection process in view of a corrective ruleset from the one or more ruleset(s) resulting in a second set of pictures;
   counting the respective number of detected faces from the face detection process for each of the pictures in the second set of pictures;
   creating the composed picture layout by arranging the second set of pictures according to the respective number of detected faces in view of a weighted presence ruleset from at least one of the group consisting of the one or more ruleset(s), a composition plane defining an overall pattern of the composed picture layout, and a context.

2. The method of claim 1, wherein the PZT process is performed from the MCN by means of Far End Camera Control.

3. The method of claim 1, wherein the PZT process is a digital PZT process.

4. The method of claim 1, wherein the corrective ruleset includes at least one of the group consisting of the following types of PZT corrections:
   framing picture to a full shot showing the entire of a subject's body in picture from head to toe;
   framing picture to a medium shot showing the subject's body in picture from head to waist; and
   framing picture to a close shot focusing on face of the subject's body in picture.

5. The method of claim 1, wherein the composition plane includes Y number of picture rows and defines a picture position Pij of each picture of the second set of pictures in the in the composed layout, where i is the horizontal position, j is the vertical position, i=[1, Xj] and j=[1, Y] where i=1 defines the leftmost picture in picture row j, and j=1 defines the uppermost picture row and Xj is the maximum number of pictures on row j.

6. The method of claim 5, wherein the weighted ruleset defines i to be increasing along with increasing respective number of detected faces in Pij.

7. The method of claim 5, wherein the weighted ruleset defines j to be decreasing along with increasing counted faces in Pij.

8. The method of claim 1, wherein the first set of pictures are pictures created in devices participating in a multipoint videoconference controlled by the MCN.

9. The method of claim 8, wherein the context is a video conference context being derived from video conference data available in the MCN like the overall number of participants, media type or default layout.

10. The method of claim 1, wherein the one or more ruleset(s) is dynamic from machine learning based on video conference statistics and participant behavior available in the MCN.

11. A Picture Layout Composer, PLC, implemented in a Multipoint Control Node, MCN, adjusted to create a composed picture layout based on a first set of pictures and one or more ruleset(s), wherein the PLC further is adjusted to the steps of:
   performing a Pan Zoom Tilt, PZT, process on each of the first set pictures according to a corresponding output of a face detection process in view of a corrective ruleset from the one or more ruleset(s) resulting in a second set of pictures;
   counting the respective number of detected faces from the face detection process for each of the pictures in the second set of pictures; and
   creating the composed picture layout by arranging the second set of pictures according to the respective number of detected faces in view of a weighted presence ruleset from the one or more ruleset(s) and/or a composition plane defining an overall pattern of the composed picture layout and/or a context.

12. The PLC of claim 11, wherein the PZT process is performed by means of Far End Camera Control.

13. The PLC of claim 11, wherein the PZT process is a digital PZT process.

14. The PLC of claim 11, wherein the corrective ruleset includes at least one from the group consisting of the following types of PZT corrections:
   framing picture to a full shot showing the entire of a subject's body in picture from head to toe;
   framing picture to a medium shot showing the subject's body in picture from head to waist; and
   framing picture to a close shot focusing on face of the subject's body in picture.

15. The PLC of claim 11, wherein the composition plane includes Y number of picture rows and defines a picture position Pij of each picture of the second set of pictures in the in the composed layout, where i is the horizontal position, j is the vertical position, i=[1, Xj] and j=[1, Y] where i=1 defines the leftmost picture in picture row j, and j=1 defines the uppermost picture row and Xj is the maximum number of pictures on row j.

16. The PLC of claim 15, wherein the weighted ruleset defines i to be increasing along with increasing respective number of detected faces in Pij.

17. The PLC of claim 15, wherein the weighted ruleset defines j to be decreasing along with increasing counted faces in Pij.

18. The PLC of claim 11, wherein the first set of pictures are pictures created in devices participating in a multipoint videoconference controlled by the MCN.

19. The PLC of claim 18, wherein the context is a video conference context being derived from video conference data available in the MCN like the overall number of participants, media type or default layout.

20. The PLC of claim 11, wherein the one or more ruleset(s) is dynamic from machine learning based on video conference statistics and participant behavior available in the MCN.

* * * * *